A. J. WAKEFIELD.
GANG PLOW.
APPLICATION FILED MAY 14, 1913.
1,097,111.
Patented May 19, 1914.
5 SHEETS—SHEET 1.
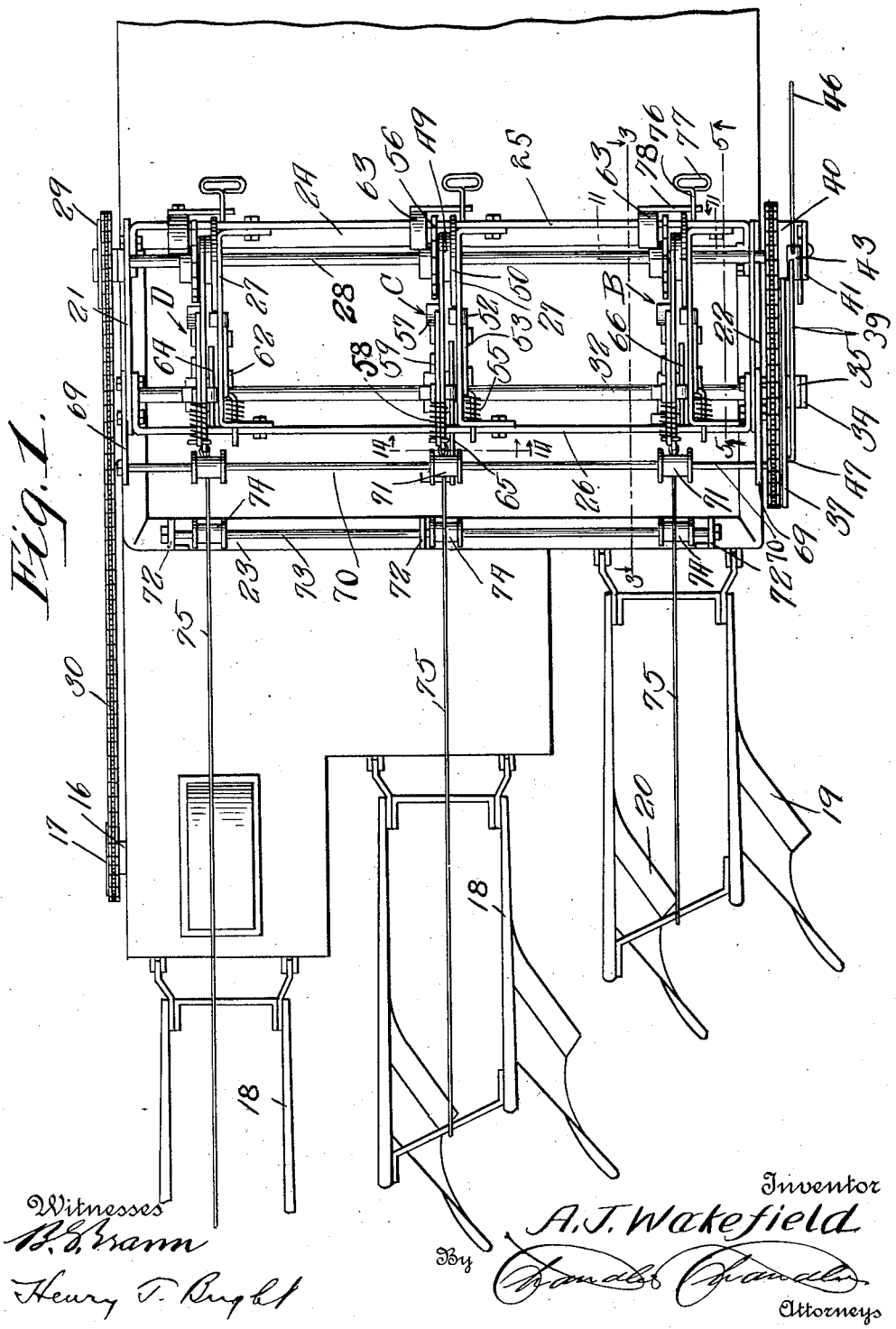
Fig. 1.
Witnesses
Inventor
A. J. Wakefield
By
Attorneys

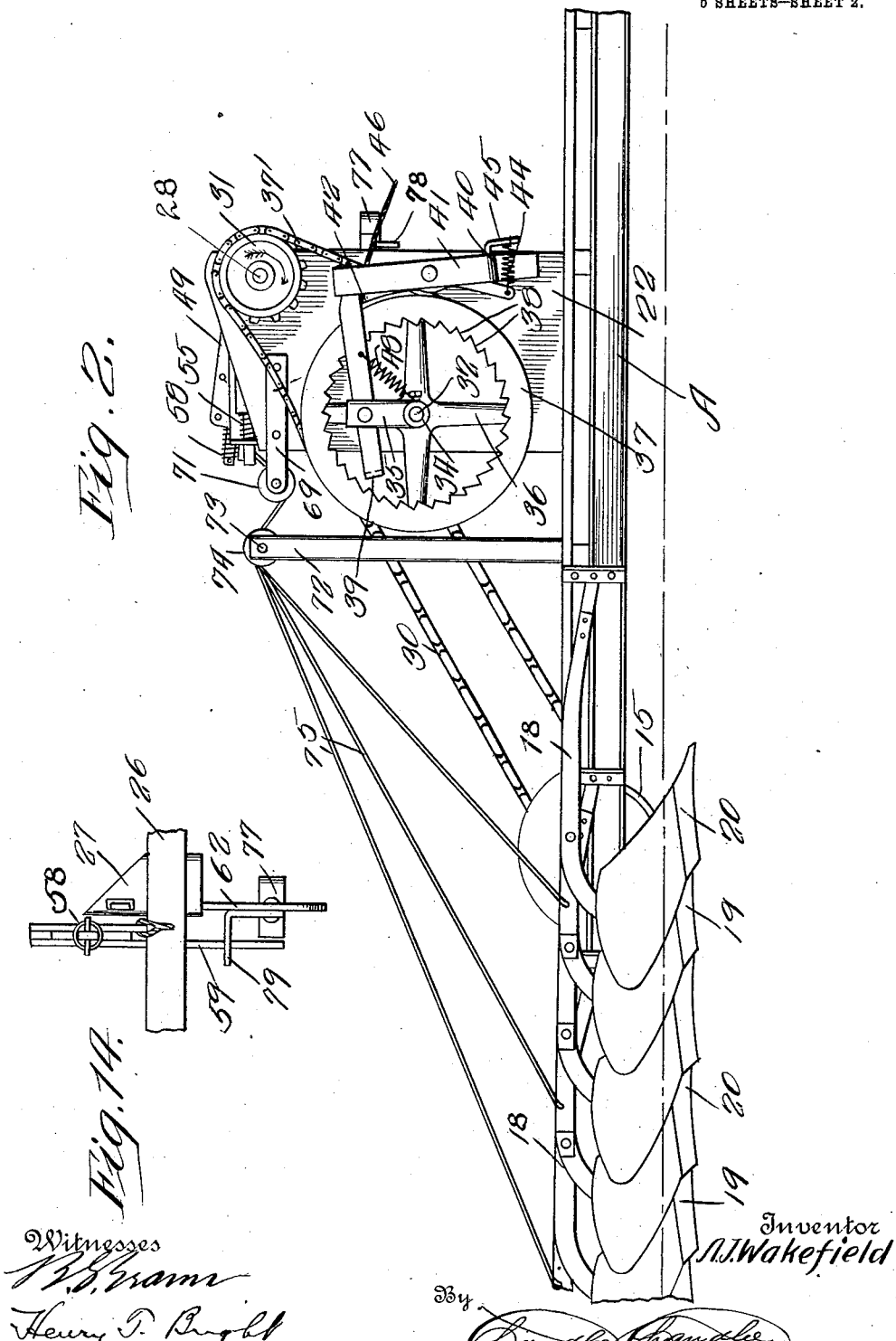

A. J. WAKEFIELD.
GANG PLOW.
APPLICATION FILED MAY 14, 1913.
1,097,111.
Patented May 19, 1914.
5 SHEETS—SHEET 3.
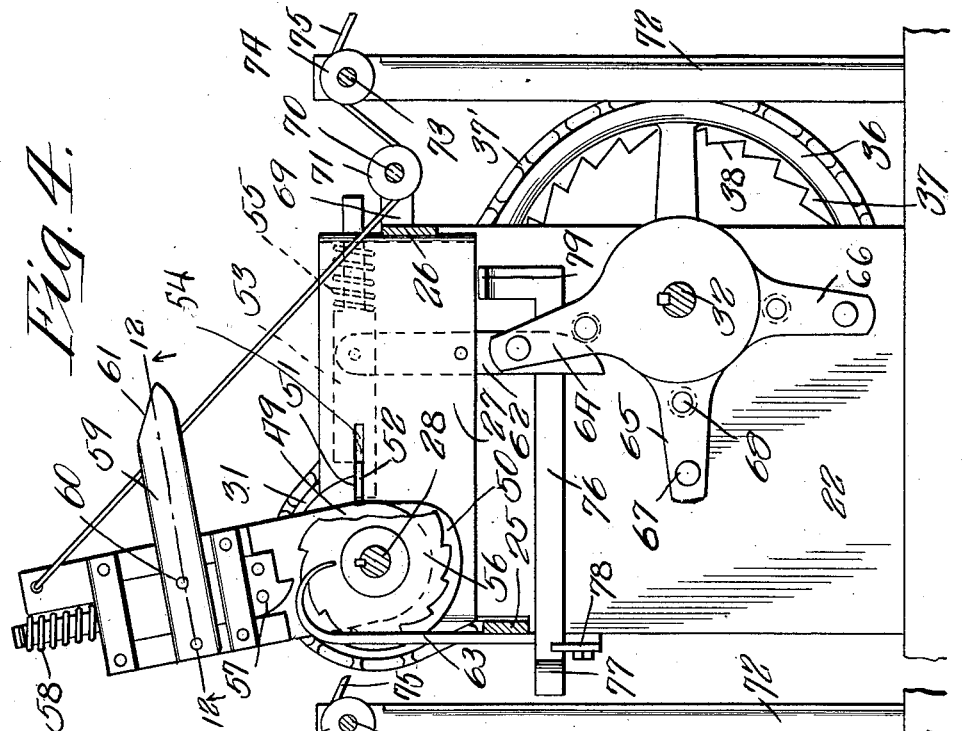
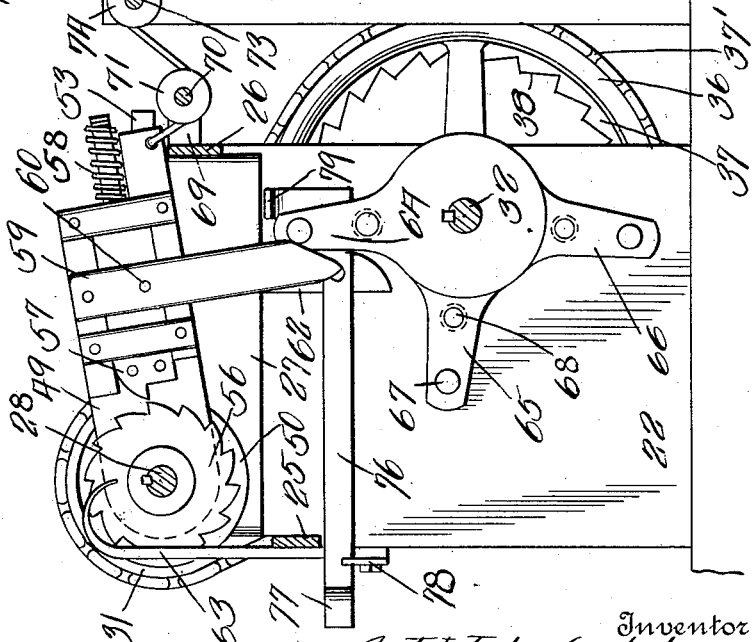
Witnesses
Inventor
A. J. Wakefield
By
Attorneys

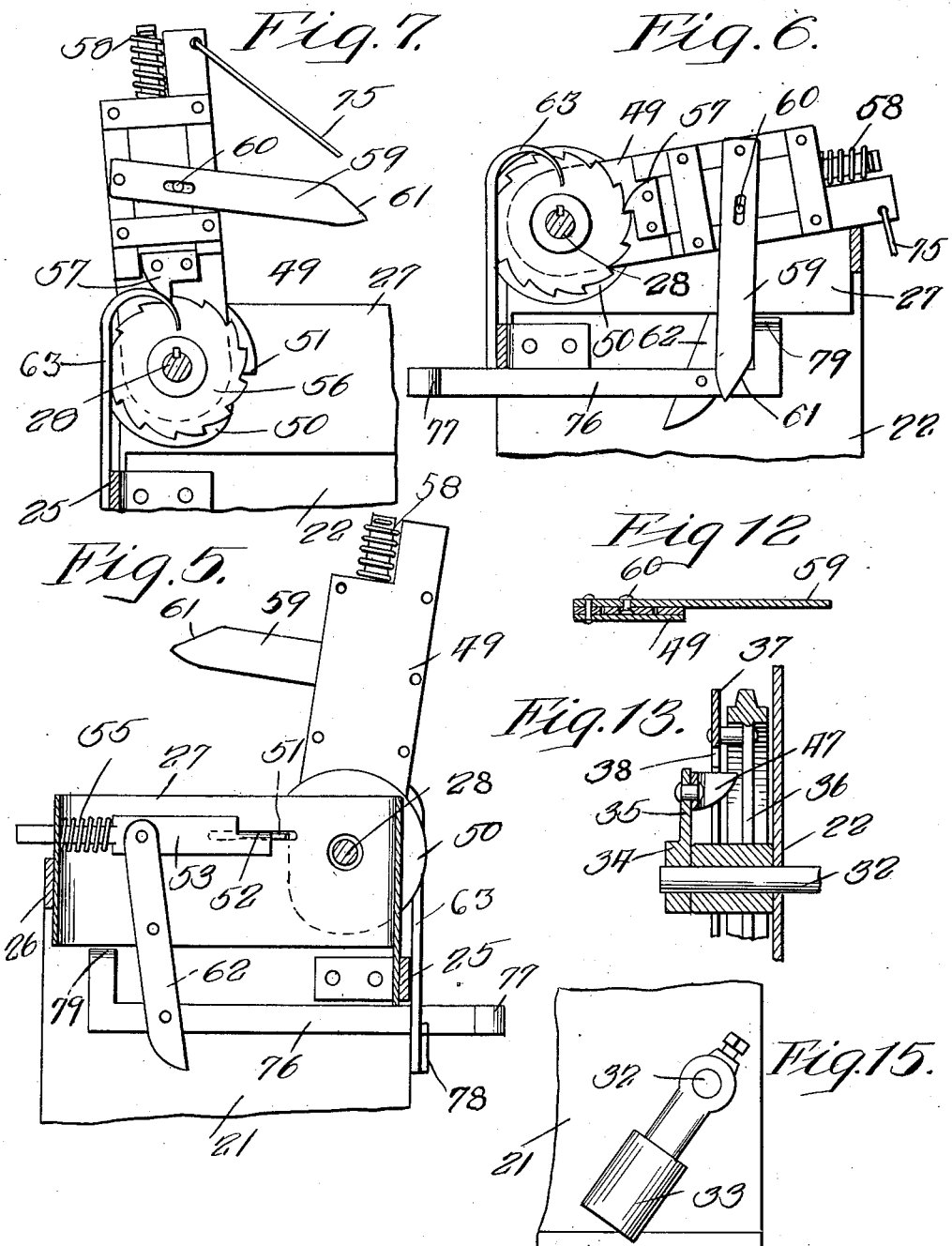

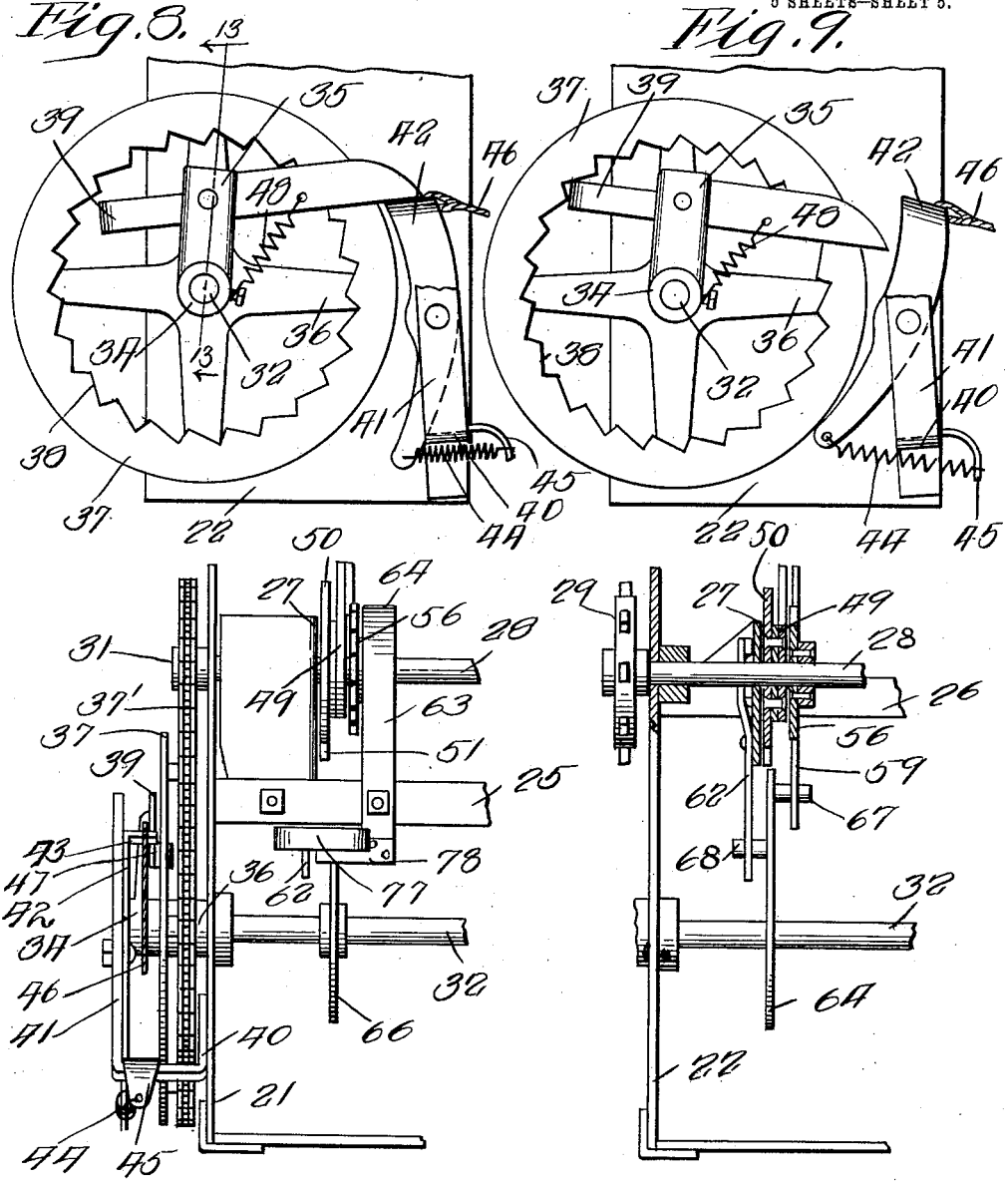

UNITED STATES PATENT OFFICE.

ALMOND J. WAKEFIELD, OF FAULKTON, SOUTH DAKOTA.

GANG-PLOW.

1,097,111. Specification of Letters Patent. Patented May 19, 1914.

Application filed May 14, 1913. Serial No. 767,596.

*To all whom it may concern:*

Be it known that I, ALMOND J. WAKEFIELD, a citizen of the United States, residing at Faulkton, in the county of Faulk, State of South Dakota, have invented certain new and useful Improvements in Gang-Plows; and I do hereby declare the following to be a full, clear, and exact description of the invention, such as will enable others skilled in the art to which it appertains to make and use the same.

This invention relates to gang plows and particularly to mechanism for raising and lowering the several sets of plows.

The object of the invention resides in the provision of a gang plow which embodies an improved means for raising in succession the several plows of the gang in order that the ends of all the furrows will lie in the same straight line.

A further object of the invention resides in the provision of a mechanism whereby the several sets of plows may be lowered successively to the ground so that the furrows will all begin on the same line.

A still further object of the invention resides in the provision of a raising and lowering mechanism for gang plows in which the several sets of plows may be raised and lowered in succession and also raised and lowered selectively according to the particular circumstances and requirements.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of a gang plow constructed in accordance with the invention; Fig. 2, a side elevation of same; Fig. 3, a section on the line 3—3 of Fig. 1 showing the parts in the position they would occupy just previous to the lifting dog being moved into engagement with the lifting ratchet; Fig. 4, a view similar to Fig. 3 showing the position of the parts when the lifting dog has been moved into engagement with the lifting ratchet and the lifting lever fully raised; Fig. 5 a section on the line 5—5 of Fig. 1 with the parts in the position they would occupy during the releasing of the locking latch to allow a set of plows to descend from an elevated position under the influence of gravity; Fig. 6, a view similar to Fig. 3 showing the lever operated to engage the lifting dog with the lifting ratchet; Fig. 7, a view of a fragment of what is shown in Fig. 6 with the parts in the position they would occupy just before the lifting dog is fully disengaged from the lifting ratchet through the medium of the dog engaging arm; Fig. 8, an enlarged side elevation of the clutch mechanism for connecting the tripping shaft of the device with the drive shaft, the parts of the clutch mechanism being shown in inactive position; Fig. 9, a view similar to Fig. 8 with the parts of the clutch mechanism operated to institute the operation of the device; Fig. 10, a front elevation of a fragment of the plow raising and lowering mechanism; Fig. 11, a section on the line 11—11 of Fig. 1; Fig. 12, a section on the line 12—12 of Fig. 4; Fig. 13, a section on the line 13—13 of Fig. 8; Fig. 14, a section on the line 14—14 of Fig. 1, and Fig. 15, a side elevation of a fragment of the device looking at the side opposite to that shown in Fig. 2.

Referring to the drawings A indicates the usual wheeled frame of a gang plow including a rear wheel 15 the axle of which is extended as at 16 and has fixed thereon a sprocket wheel 17 for a purpose that will presently appear. Pivoted to the rear end of the frame A in staggered relation are plow frames 18 each of which carries plows 19 and 20 at its free end.

The mechanism for raising and lowering the plow frames 18 is mounted upon the frame A and is shown as comprising vertical side members 21 and 22 which are connected together at their lower ends by front and rear cross members 23 and 24 respectively and at their upper ends by front and rear cross members 25 and 26 respectively. The front and rear cross members 25 and 26 are connected together at spaced intervals by U-shaped members 27, the arms of said U-shaped members bearing against the inner faces of the cross members 25 and 26 respectively and the number of U-shaped members 27 corresponding to the number of pivoted plow frames 18. The mechanism is formed of a plurality of similar heads corresponding in number to the number of plow frames 18 and as the parts of each head are identical only one of said heads will be described in detail, the reference characters employed being applied to corresponding parts of the remaining heads. Journaled between the side members 21 and 22 and passing through the various U-shaped members 27 is an operating shaft 28 one end of which is extended through the side member 21 and has fixed thereon a sprocket wheel 29 which is connected to the sprocket wheel 17 by a sprocket chain 30 so that the movement of the plow along the ground will continuously rotate the shaft 28. The end of the shaft 28 remote from the sprocket wheel 29 is extended through the side member 22 and has fixed thereon a sprocket wheel 31 for a purpose that will presently appear. Journaled between the side members 21 and 22 a considerable distance below the shaft 28 and adjacent the rear ends of said side members is a tripping shaft 32 one end of which is extended through the side member 21 and has fixed thereon in radial disposed relation a weighted arm 33. (Fig. 15.) The end of the shaft 32 remote from the weighted arm 33 is extended through the side member 22 and has fixed thereon a sleeve 34 provided with a radial arm 35 for a purpose that will presently appear. Loosely mounted on the shaft 32 between the sleeve 34 and the side member 22 is a sprocket wheel 36 which is connected to the sprocket wheel 31 by a sprocket chain 37'. Secured against the outer side of the sprocket wheel 36 is a ring 37 provided with internal teeth 38 which are adapted to be engaged by a pawl 39 pivoted against the inner side of the radial arm 35. Secured against the outer side of the member 22 forward of the sprocket wheel 36 is a bracket 40 which includes a vertical arm 41 disposed in spaced relation to the side member 22. Pivoted against the inner side of the arm 41 is a pawl locking lever 42 the upper end of which is turned inwardly as at 43, while the lower end of said lever is connected to one end of a spring 44, the other end of said spring being connected to a finger 45 projecting forwardly from the bracket 40. This spring 44 constantly tends to hold the upper end of the lever 42 at the limit of its rearward movement. The upper end of the lever 42 has secured thereto a pull cord 46 through the instrumentality of which said upper end of the lever 42 may be drawn forwardly against the influence of the spring 44. It will be noted that the pawl 39 is pivoted to the arm 35 at a point between its ends and that one end of said pawl extends across the outer side of the ring 37 so as to be engaged by the inturned upper end 43 of the lever 42 as said pawl rotates with the sleeve 34. It will be further noted that the end of the pawl 39 remote from the end thereof which is adapted to coöperate with the lever 42 is turned inwardly as at 47 so as to coöperate with the teeth 38 of the ring 37. A spring 48 has one end connected to the sleeve 34 and its other end connected to the pawl 39 and constantly tends to move the inturned end of said pawl 39 into operative engagement with the teeth 38 of the ring 37.

From the construction so far described it will be apparent that as the plow moves along the ground the shaft 28 will be constantly rotated in the direction of the arrow in Fig. 2 and that such rotation of the shaft 28 will be imparted to the sprocket wheel 36 by means of the sprocket chain 37'. If it is desired to lock the sprocket wheel 36 to the shaft 32 it is only necessary to move the lever 42 from the position shown in Fig. 8 to the position shown in Fig. 9 when the spring 48 will rock the pawl 39 so as to engage the inturned end of said pawl with the teeth 38 when continued rotation of the sprocket wheel 38 will produce a corresponding rotation of the shaft 32. During this rotation of the shaft 32 the free end of the weighted arm 33 will be moved to its greatest elevation and when the free end of said arm 33 begins to descend the weight of said arm will rotate the shaft 32 more rapidly than said shaft is being rotated by the sprocket wheel 36 and as a result of this increased speed of rotation the end of the pawl 39 remote from the inturned end 47 will engage the inturned end of the lever 42 which lever has been previously allowed to return to normal position. The engagement of the pawl 39 with the inturned end 43 of the lever 42 will rock said pawl against the influence of the spring 48 and disengage the pawl from the teeth 38 so as to automatically disconnect the shaft 32 from the sprocket wheel 46. To again rotate the shaft 32 this operation is repeated. During each rotation of the shaft 32 just described the heads of the mechanism are operated to elevate the free ends of the plow frames 18 and as will hereinafter appear.

The heads of the mechanism indicated respectively at B, C and D are each shown as comprising a lifting arm 49 pivoted on the shaft 28 and having its free end normally resting on the upper cross member 26. Rotatable on the shaft 28 between the adjacent U-shaped member 27 and the lifting arm 49 is a disk 50 which is suitably secured to the arm 49 so as to partake of the movement of the latter. This disk 50 is provided with a tooth 51 which is adapted to coöperate with the laterally directed end 52 of a latch 53 slidably mounted on the adjacent U-shaped member 27, the laterally directed end 52 of said latch working in a slot 54 formed in the U-shaped member 27. A spring 55 constantly tends to move the latch to a position to effect the engagement of the laterally directed end with the tooth 51 and said tooth is so positioned that when the arm 49 is fully raised the laterally directed end 52 of the latch 53 will pass beneath the tooth and automatically lock the arm 49 in elevated position. Fixed on the shaft 28 on the opposite side of the arm 49 from the disk 50 is a lifting ratchet 56 adapted to be operatively engaged by a lifting dog 57 slidably mounted on the adjacent side of the arm 49 and normally held out of operative relation to said lifting ratchet by means of a spring 58. Pivoted to the arm 49 and overlying the lifting dog 57 is a lever 59 which is also connected to the lifting dog 57 at 60 and terminates at its lower end in a cam face 61. By this construction it will be apparent that when the lower end of the lever 59 is moved toward the shaft 28 the dog 57 will be moved into operative engagement with the lifting ratchet 56 so that the rotation of the shaft 28 will elevate the free end of the lifting arm 49. Pivoted on the U-shaped member 27 is a lever 62 the upper end of which is pivotally connected to the latch 53, the function of which lever being to move the latch 53 against the influence of the spring 55 so as to disengage the laterally directed end 52 of the latch from the tooth 51 of the disk 53, it being evident that when the lower end of the lever 62 is moved toward the shaft 28 said disengagement of the latch end from the tooth 51 will be effected. Mounted on the cross member 25 adjacent the outer side of the lifting ratchet 56 is a dog releasing arm 63 having a curved upper end positioned to coöperate with the dog 57 just at the time the lifting arm 49 reaches the limit of its upward movement to release said lifting dog from engagement with the lifting ratchet.

The heads B, C and D are adapted to be successively operated to elevate and lower the lifting arm 49 through the medium of tripping arms 64, 65 and 66 respectively which are fixed on the tripping shaft 32 and are disposed in different radial dispositions so that they will be brought into successive coöperation with the heads of the mechanism as said shaft 32 is rotated. Each of the tripping arms 64, 65 and 66 is provided with laterally directed fingers 67 and 68, the finger 67 being adapted to coöperate with the lower end of the lever 59 and the finger 68 being positioned inwardly of the finger 57 on the opposite side of the arm and adapted to coöperate with the lower end of the lever 62.

Secured to the upper end of the side members 21 and 22 and extending rearwardly therefrom are brackets 69 in which is mounted a rod 70 and rotatable on this rod are pulleys 71 corresponding in number to the number of heads with which the machine is provided. Mounted upon the frame A at the rear of the rod 70 are uprights 72 disposed in transverse alinement and having mounted in their upper ends a rod 73 upon which is rotatably mounted pulleys 74 corresponding in number to the heads of the machine. Secured to the free end of each arm 49 is a cable 75 which is trained under the adjacent pulley 71 and then over the adjacent pulley 74 and has its other end suitably connected to the corresponding plow frame 18.

To operate the mechanism the shaft 32 is connected to the sprocket wheel 36 in the manner heretofore described. As the shaft 32 rotates the finger 67 of the arm 64 will engage the lower end of the lever 59 and slide the lifting dog 57 into engagement with the lifting ratchet 56. The rotation of the lifting ratchet 56 will then elevate the free end of the lifting arm 49 and this movement of the lifting arm 49 will be transmitted to the corresponding plow frame 18 to raise the free end of the latter. As the arm 49 reaches the limit of its upward movement the upper end 64 of the dog releasing arm will engage the lifting dog 57 and gradually move same out of operative relation to the lifting ratchet. At the moment the lifting dog is disconnected from the lifting ratchet the disk 50 has moved so that the tooth 51 is positioned just above the slot 54 and the laterally directed end 52 of the latch 53 will move beneath the tooth to lock the arm 49 in elevated position against the influence of gravity. Continued rotation of the shaft 32 will successively operate the heads C and D to elevate the arms 49 thereof, the tripping arms 65 and 66 being properly positioned to accomplish this purpose. After the arms 49 of all the heads of the machine have been raised the shaft 32 will be automatically disconnected in the manner heretofore referred to. To lower the arms of the heads of machine successively it is only necessary to again connect the shaft 32 with the sprocket wheel 36 and upon the initial rotation of the shaft 32 the finger 68 will engage the lower end of the lever 62 and retract the latch 53 so as to disengage the inwardly directed end or finger 52 of said latch from the tooth 51 of the disk 50 and thereby allow the arm 49 to descend under the influence of gravity. Continued rotation of the shaft 32 will successively release the arms 49 of the heads C and D to the influence of gravity when the shaft 32 will be automatically disconnected from the sprocket wheel 36.

The machine further includes means whereby the arms 49 of the heads B, C and D may be raised and lowered selectively. To this end there is provided for each head an arm 76 the forward end of which terminates in a hand grip 77 and is slidable in a bracket 78 mounted on the lower end of the dog releasing arm 63. The rear end of the arm 76 is pivotally connected to the lower end of the lever 62 and terminates in a laterally directed portion 79 which intersects the plane of the lever 59 and is disposed at the rear of said lever. To raise the arm 49 of any one of the heads of the machine it is only necessary to slide the arms 76 of said head forwardly until the laterally directed end of said arm 79 engages the lever 59 and moves the dog 57 into engagement with the lifting ratchet 56. The arm 70 is then released and the lifting arm 49 will be elevated and locked as will be obvious. To lower the arm 49 of any head of the machine it is only necessary to again slide the arm 76 associated with said head forwardly, which movement of said arm 76 will rock the lever 62 forwardly at its lower end and disengage the laterally directed end 52 of the latch 53 from engagement with the tooth 51 of the disk 50 and permit the arm 49 to descend under the influence of gravity.

What I claim is:—

1. In a gang plow, the combination of a frame, a power driven shaft journaled in said frame, a plurality of spaced longitudinal bars included in said frame and disposed transversely of the shaft, a plurality of lifting ratchets fixed on said shaft and disposed respectively on corresponding sides of said bars, a lifting lever pivoted on said shaft between each lifting ratchet and the adjacent bar, a disk rotatably mounted on the shaft between each lifting lever and the adjacent bar and connected to the adjacent lifting lever, a tooth on the periphery of each disk, a dog mounted on each lifting lever and normally held out of engagement with the adjacent lifting ratchet, means for forcing the dogs successively into engagement with respective lifting ratchets, means for disengaging said dogs from the lifting ratchet when the lifting levers have been fully elevated, a latch slidably mounted on each bar, and means for automatically moving said latch into engagement with the tooth of the adjacent disk when the adjacent lifting lever is fully raised to lock said lever against descent under the influence of gravity.

2. In a gang plow, the combination of a frame, a power driven shaft journaled in said frame, a plurality of spaced longitudinal bars included in said frame and disposed transversely of the shaft, a plurality of lifting ratchets fixed on said shaft and disposed respectively on corresponding sides of said bars, a lifting lever pivoted on said shaft between each lifting ratchet and the adjacent bar, a disk rotatably mounted on the shaft between each lifting lever and the adjacent bar and connected to the adjacent lifting lever, a tooth on the periphery of each disk, a dog mounted on each lifting lever and normally held out of engagement with the adjacent lifting ratchet, means for forcing the dogs successively into engagement with respective lifting ratchets, means for disengaging said dogs from the lifting ratchets when the lifting levers have been fully elevated, a latch slidably mounted on each bar, and means for successively disengaging said latches from the teeth of respective disks.

3. In a gang plow, the combination of a frame, a power driven shaft journaled in said frame, a plurality of spaced longitudinal bars included in said frame and disposed transversely of the shaft, a plurality of plow lifting devices each of which comprises a lifting ratchet fixed on said shaft on one side of a respective longitudinal bar, a lifting lever pivoted on said shaft between the lifting ratchet and the longitudinal bar, a disk rotatably mounted on said shaft between the lifting lever and the longitudinal bar and connected to said lever, a tooth formed on said disk, a dog slidably mounted on the lifting lever and normally held out of engagement with the lifting ratchet, a dog operating lever pivoted on the lifting lever and connected to said dog whereby the movement of said lever in one direction will force said dog into engagement with the lifting ratchet, a latch slidably mounted on the longitudinal bar and adapted to engage the tooth on said disk when the lifting lever is fully elevated to lock said lever against descent under the influence of gravity, a lever pivoted on the longitudinal bar and having its upper end connected to said latch whereby the movement of said lever in one direction will disengage the latch from the tooth of the disk to permit the lifting lever to descend under the influence of gravity, a trip shaft, means for connecting said trip shaft to the power driven shaft, tripping arms fixed on said trip shaft adapted during the rotation of said shaft to successively operate the dog controlling levers to force said dogs into engagement with said lifting ratchets, and further adapted during subsequent rotation of the trip shaft to successively engage the latch levers to disengage the latches from the teeth of respective disks.

4. In a gang plow, the combination with a power driven counter shaft having a plurality of ratchet wheels, fixed thereon, of lifting levers pivoted on said shaft and connected to the plows, dogs carried by said levers and normally held out of engagement with the teeth of respective ratchet wheels, a tripping shaft, tripping arms fixed on said tripping shaft, means operated by said tripping arms during rotation of the tripping shaft to successively engage said dogs with respective ratchet wheels, a latch mechanism associated with each lifting lever automatically locking said lever in raised position, means operated by the tripping arms during subsequent rotation of the tripping shaft to successively release said latch mechanisms to permit descent of the lifting devices, means for connecting said tripping shaft with the counter shaft, and means for automatically disconnecting the tripping shaft from the counter shaft at the termination of the operations of raising and lowering the lifting lever respectively.

In testimony whereof, I affix my signature, in the presence of two witnesses.

ALMOND J. WAKEFIELD.

Witnesses:
C. F. NIEMEYER,
T. G. JOHNSON.

Copies of this patent may be obtained for five cents each, by addressing the "Commissioner of Patents, Washington, D. C."